(12) United States Patent
Jiang et al.

(10) Patent No.: US 12,335,337 B2
(45) Date of Patent: *Jun. 17, 2025

(54) PEER-TO-PEER NETWORK SCHEDULING METHOD AND SYSTEM

(71) Applicant: SHANGHAI BILIBILI TECHNOLOGY CO., LTD., Shanghai (CN)

(72) Inventors: Jun Jiang, Shanghai (CN); Junwei Zhu, Shanghai (CN); Yongfang Qin, Shanghai (CN); Nanling Zheng, Shanghai (CN)

(73) Assignee: SHANGHAI BILIBILI TECHNOLOGY CO., LTD, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/276,015

(22) PCT Filed: Jan. 19, 2022

(86) PCT No.: PCT/CN2022/072815
§ 371 (c)(1),
(2) Date: Aug. 4, 2023

(87) PCT Pub. No.: WO2022/166593
PCT Pub. Date: Aug. 11, 2022

(65) Prior Publication Data
US 2024/0106891 A1    Mar. 28, 2024

(30) Foreign Application Priority Data
Feb. 5, 2021    (CN) .......................... 202110164671.1

(51) Int. Cl.
*H04L 67/1074* (2022.01)

(52) U.S. Cl.
CPC .................................. *H04L 67/108* (2013.01)

(58) Field of Classification Search
CPC ..... H04L 67/108; H04L 67/06; H04L 67/104; H04L 67/1097
See application file for complete search history.

(56) References Cited

U.S. PATENT DOCUMENTS 9,094,416 B2 *   7/2015   Magharei ............. H04L 67/104
9,325,786 B2 *   4/2016   Chan .................... H04N 21/632
(Continued)

FOREIGN PATENT DOCUMENTS

CN    107959704 A    4/2018
CN    107995187 A    5/2018
(Continued)

OTHER PUBLICATIONS

International Patent Application No. PCT/CN2022/072815; Int'l Search Report; dated Apr. 24, 2022; 3 pages.

*Primary Examiner* — Jerry B Dennison
(74) *Attorney, Agent, or Firm* — BakerHostetler

(57) ABSTRACT

Embodiments of this application provide a peer-to-peer network scheduling method. The method includes: obtaining a fragment file list, where the fragment file list includes information about a plurality of fragment files, each fragment file includes one or more segments, and each segment corresponds to one segment number; downloading a missing segment in a target fragment file from another client device based on a downloading progress of downloading each segment of the target fragment file by each client device; and when a player requests the target fragment file, stopping downloading the missing segment in the target fragment file from the another client device, and downloading the missing segment in the target fragment file from a CDN server. According to the embodiments of this application, a computation amount and resource consumption of a Tracker (Continued)

server can be reduced, and data transmission efficiency of a P2P network can be improved.

20 Claims, 5 Drawing Sheets

(56) References Cited

U.S. PATENT DOCUMENTS

| | | | | |
|---|---|---|---|---|
| 10,009,396 | B2* | 6/2018 | Guo | H04L 65/611 |
| 2008/0005336 | A1* | 1/2008 | Cohen | H04L 67/1085 |
| | | | | 709/227 |
| 2008/0133535 | A1* | 6/2008 | Fischer | H04L 67/104 |
| 2008/0140853 | A1* | 6/2008 | Harrison | H04L 67/108 |
| | | | | 709/231 |
| 2011/0055312 | A1* | 3/2011 | Purdy, Sr. | H04L 67/1021 |
| | | | | 709/230 |
| 2012/0071132 | A1* | 3/2012 | Carlander | H04W 12/06 |
| | | | | 455/411 |
| 2012/0278728 | A1* | 11/2012 | Malin | H04N 21/44209 |
| | | | | 709/217 |
| 2014/0012906 | A1* | 1/2014 | Teja | H04L 67/02 |
| | | | | 709/204 |
| 2014/0195652 | A1* | 7/2014 | Yerkes | H04L 67/1046 |
| | | | | 709/219 |
| 2017/0063981 | A1* | 3/2017 | Hyun | H04L 43/0817 |
| 2017/0264675 | A1* | 9/2017 | Yao | H04L 67/101 |
| 2018/0063232 | A1* | 3/2018 | Chau | H04L 67/108 |
| 2018/0337896 | A1* | 11/2018 | Frankel | H04L 9/3297 |
| 2020/0077161 | A1* | 3/2020 | Lohmar | H04L 65/762 |
| 2020/0329284 | A1* | 10/2020 | Denoual | H04L 69/321 |
| 2023/0246808 | A1* | 8/2023 | Léal | H04N 21/23476 |
| | | | | 380/28 |
| 2024/0106890 | A1* | 3/2024 | Jiang | H04L 67/06 |

FOREIGN PATENT DOCUMENTS

| | | | | |
|---|---|---|---|---|
| CN | 110677737 | A | 1/2020 | |
| CN | 112311874 | A * | 2/2021 | H04L 67/06 |
| CN | 112311897 | A | 2/2021 | |
| CN | 112769958 | A | 5/2021 | |
| WO | WO 2017/035795 | A1 | 3/2017 | |

* cited by examiner

PEER-TO-PEER NETWORK SCHEDULING METHOD AND SYSTEM

CROSS-REFERENCE TO RELATED APPLICATION

This application is the U.S. National Stage of International Application No. PCT/CN2022/072815, filed on Jan. 19, 2022, which claims priority to Chinese Patent Application No. 202110164671.1, filed on Feb. 5, 2021, and entitled "PEER-TO-PEER NETWORK SCHEDULING METHOD AND SYSTEM", both of which are incorporated herein by reference in their entireties.

TECHNICAL FIELD

Embodiments of this application relate to the data transmission field, and in particular, to a peer-to-peer network scheduling method and system, a device, and a computer-readable storage medium.

BACKGROUND

An existing live streaming media P2P distribution system includes a Tracker service, a CDN server, and a client device. In this system, client devices download different segments based on an instruction of the Tracker server, and exchange data with each other to obtain complete content. The Tracker server may learn of a specific segment for which a large quantity of client devices are responsible and a specific segment for which a small quantity of client devices are responsible; when an insufficient quantity of client devices are responsible for a segment, may further add some client devices responsible for the segment; and notifies each client device of a segment for which the client device is responsible currently.

However, the Tracker server has a large computing amount and high resource consumption. In addition, the Tracker server cannot learn of a connection status between two client devices and a network status after a connection, which may lead to the following situations: (1) If a client device with a slow uplink speed is responsible for a segment, most client devices may need to download the segment from the CDN server to obtain complete data, resulting in a poor effect of reducing traffic. (2) Because whether a connection is successfully established between two client devices cannot be learned of, scheduling may fail, resulting in a poor effect of reducing traffic. (3) Due to a network interconnection problem, the following situation may be further caused: A client device A and a client device B transmit data very fast, the client device B and a client device C also transmit data very fast, but the client device A and the client device C transmit data very slow, resulting in low data transmission efficiency. Therefore, how to reduce a computing amount of the Tracker server and improve data transmission efficiency of a P2P network has become an urgent technical problem to be resolved.

SUMMARY

Embodiments of this application aim to provide a peer-to-peer network scheduling method and system, a computer device, and a computer-readable storage medium, to resolve a technical problem that a Tracker server has a large computing amount and high resource consumption, and a P2P network has low data transmission efficiency.

An aspect of the embodiments of this application provides a peer-to-peer network scheduling method, including: obtaining a fragment file list, where the fragment file list includes a plurality of fragment files, each fragment file includes one or more segments, and each segment corresponds to one segment number; downloading a missing segment in a target fragment file from another client device based on a downloading progress of each client device for each segment of the target fragment file; and when a player requests the target fragment file, stopping downloading the missing segment in the target fragment file from the another client device, and downloading the missing segment in the target fragment file from a CDN server.

For example, the method further includes: when the target fragment file is complete, playing the target fragment file by using the player.

For example, the target fragment file is split at a predetermined time frequency, to obtain a plurality of partial fragments. The plurality of partial fragments include a first partial fragment and a second partial fragment. When the target fragment file is complete, the target fragment file is played by using the player.

For example, the downloading a missing segment in a target fragment file from another client device based on a downloading progress of each client device for each segment of the target fragment file includes: downloading each segment in the target fragment file based on the fragment file list, and obtaining a first downloading progress of downloading each fragment by the client device; requesting a second downloading progress of each fragment of the target fragment file from another client device in a peer-to-peer network; and downloading the missing segment in the target fragment file from the another client device based on the first downloading progress and the second downloading progress.

For example, the requesting a second downloading progress of each fragment of the target fragment file from another client device in a peer-to-peer network includes: requesting the second downloading progress of each segment in the target fragment file from the another client device based on a request parameter, where the request parameter includes a file name of the target fragment file; and receiving response data from the another client device, where the response data includes the second downloading progress of each segment in the target fragment file.

For example, the method further includes: if the second downloading progress of each segment in the target fragment file is not greater than the first downloading progress, requesting the second downloading progress of each segment in the target fragment file from the another client device again.

For example, the method further includes: responding to a request of the another client device, and sending a corresponding segment to the another client device; and when a quantity of bytes sent to the another client device is greater than a preset threshold, refusing to respond to a data request of the another client device.

For example, the method further includes: downloading one or more target segments corresponding to one or more target segment numbers from the CDN server based on the fragment file list and the one or more target segment numbers, where the one or more target segment numbers are located in a target segment list; obtaining first data of each segment, second data of each segment, and a quantity of bytes of each segment, where the first data is a quantity of bytes of each segment that are obtained from the another client device, and the second data is a quantity of bytes of each segment that are sent to the another client device; calculating a first ratio of each segment based on the first data and the quantity of bytes of each segment; calculating a second ratio of each segment based on the second data and the quantity of bytes of each segment; adjusting the target segment list based on the first ratio and/or the second ratio, to obtain an adjusted target segment list; and downloading one or more target segments corresponding to one or more target segment numbers in the adjusted target segment list from the CDN server.

For example, the adjusting the target segment list based on the first ratio and/or the second ratio, to obtain an adjusted target segment list includes: if a first ratio of a segment is less than a first preset ratio, and a segment number of the segment is not a target segment number in the target segment list, adding the segment number of the segment to the target segment list; or if a second ratio of a segment is less than a second preset ratio, and a segment number of the segment is a target segment number in the target segment list, removing the target segment number corresponding to the segment from the target segment list.

An aspect of the embodiments of this application further provides a peer-to-peer network scheduling system, including: a list obtaining module, configured to obtain a fragment file list, where the fragment file list includes a plurality of fragment files, each fragment file includes one or more segments, and each segment corresponds to one segment number; a first downloading module, configured to download a missing segment in a target fragment file from another client device based on a downloading progress of each client device for each segment of the target fragment file; and a second downloading module, configured to: when a player requests the target fragment file, stop downloading the missing segment in the target fragment file from the another client device, and download the missing segment in the target fragment file from a CDN server.

An aspect of the embodiments of this application still provides a computer device. The computer device includes a memory, a processor, and a computer program that is stored in the memory and capable of running on the processor, and the processor implements steps of the peer-to-peer network scheduling method when executing the computer program.

An aspect of the embodiments of this application still further provides a computer-readable storage medium. The computer-readable storage medium stores a computer program, and the computer program may be executed by at least one processor, to enable the at least one processor to perform steps of the peer-to-peer network scheduling method.

According to the peer-to-peer network scheduling method and system, the device, and the computer-readable storage medium provided in embodiments of this application, the missing segment in the target fragment file may be automatically downloaded from the another client device based on a downloading progress of downloading each segment by a client device and a downloading progress of downloading each segment by the another client device, to adjust a downloading policy of downloading each segment and improve data transmission efficiency of the P2P network. In addition, in the foregoing process, a Tracker server does not need to give an indication, thereby effectively reducing a computing amount and resource consumption of the Tracker server.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application. All other embodiments obtained by a person of ordinary skill in the art based on embodiments of this application without creative efforts shall fall within the protection scope of this application.

It should be noted that the terms "first" and "second" in this application are merely used for description, and shall not be understood as an indication or implication of relative importance or an implicit indication of a quantity of indicated technical features. Therefore, features limited by "first" or "second" may explicitly or implicitly include at least one of the features. In addition, technical solutions in embodiments may be combined with each other, provided that a person of ordinary skill in the art can implement the combination. When the combination of the technical solutions is contradictory or cannot be implemented, it should be considered that the combination of the technical solutions does not exist and does not fall within the protection scope of this application.

Terms used in this application are explained as follows:

A peer-to-peer network (P2P network) is an Internet system in which no central server exists and peers exchange information.

A content delivery network (CDN) server is an intelligent virtual network established based on an existing network, and relies on edge servers deployed in various places. Functional modules such as a load balancing module, a content distribution module, and a scheduling module of a central platform are used, so that a user obtains required content nearby, to reduce network congestion.

A tracker server is a server on which an application Tracker runs. Tracker can track a quantity of users who are simultaneously downloading a same file, and notify a client device of a client device that communicates with Tracker.

Figure 1:
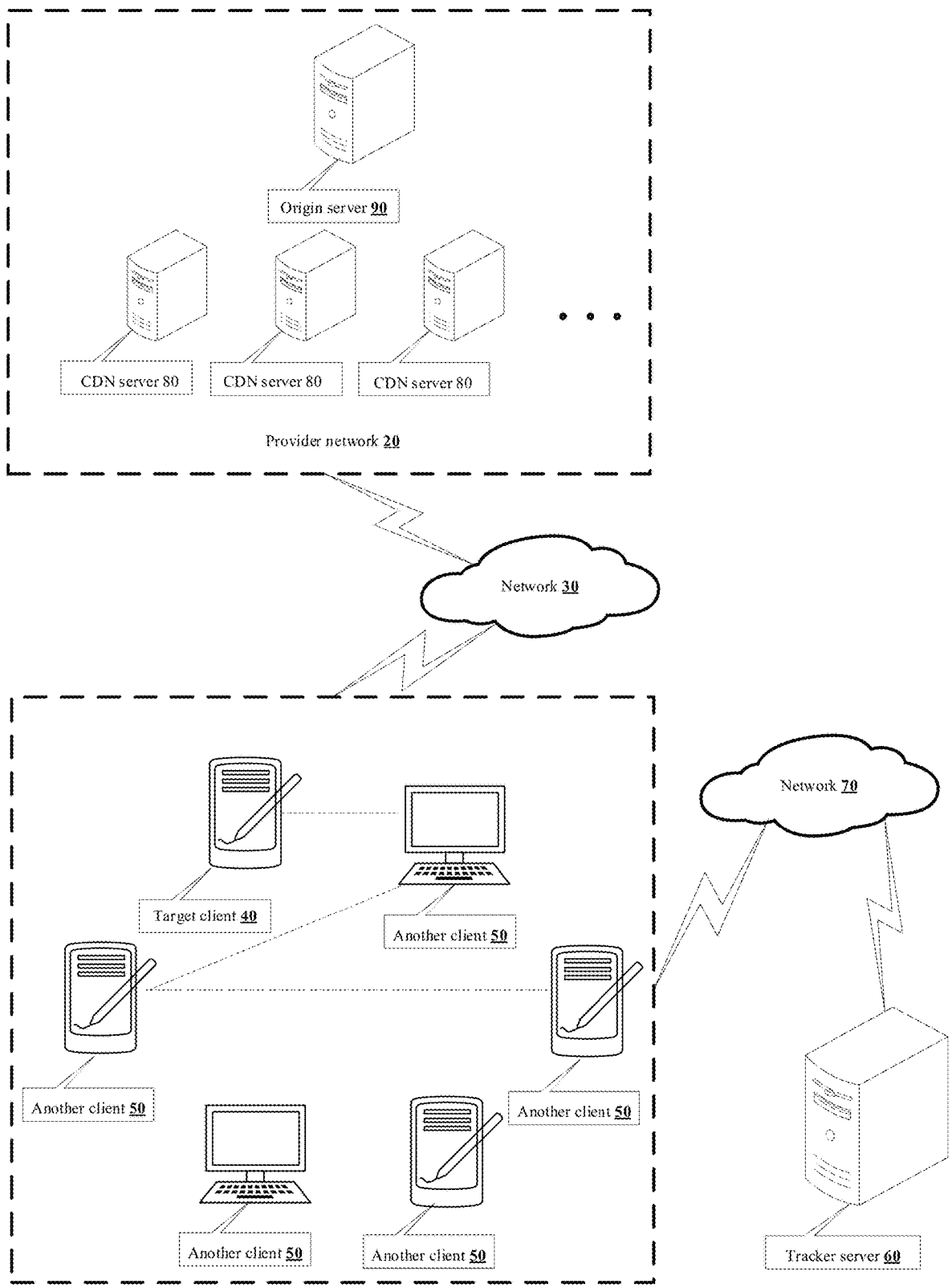
FIG. 1 is an example of a schematic diagram of a block diagram of a peer-to-peer network scheduling system according to an embodiment of this application.

FIG. 1 is an example of a schematic diagram of an environment of a peer-to-peer network scheduling method according to this application. In an example embodiment, a provider network may be connected to a target client device 40 and a plurality of other client devices 50 through a network 30. A Tracker server 60 may be connected to the target client device 40 through a network 70, and the Tracker server 60 may also be connected to the plurality of other client devices 50 through one or more networks 70.

In an example embodiment, the provider network 20 may include a plurality of CDN servers 80. Each CDN server 80 may be configured to provide various services, for example, store content provided by an origin server 90, and distribute the content to the target client device 40 and the plurality of other client devices 50. The origin server 90 may be implemented as a part of the provider network 20. In another embodiment, the origin server 90 may be managed by a separate service provider other than a service provider of the provider network 20.

The origin server 90 is configured to: perform a fragmentation operation on original data (for example, live streaming data), and perform a segmentation operation on a fragment file obtained through the fragmentation operation, to obtain a segment corresponding to each fragment file. The origin server 90 is further configured to establish a fragment file list based on the fragment file and a segment corresponding to each fragment file. The origin server 90 is further configured to provide, by using the CDN server 80, a plurality of client devices with the fragment file list and the segment corresponding to each fragment file. The origin server 90 may include a content streaming service, for example, an internet protocol video streaming service. The content streaming service may be configured to distribute the content based on various transmission technologies. The origin server 90 may be configured to provide the content, for example, a video, audio, text data, and/or a combination thereof provided by a terminal of a streamer. The content may include a content stream (for example, a video stream, an audio stream, or an information stream), a content file (for example, a video file, an audio file, or a text file), and/or other data.

The Tracker server 60 may be configured to: assign a user ID to each client device, and provide an online user list. The Tracker server 60 may be further configured to help client devices to establish a connection, to establish a peer-to-peer network. Specifically, after each client device is connected to the Tracker server 60, the Tracker server 60 generates a unique ID representing the client device, assigns the unique ID to the client device, and adds the unique ID to the online user list. When the client device requests the online user list, the Tracker server 60 returns a list of a unique ID of a client device that is currently connected to the Tracker server 60. When client devices are to establish a connection, the Tracker server 60 forwards handshake data between two client devices, and the two client devices start to establish a connection after receiving handshake data of each other.

The target client device 40 and the plurality of other client devices 50 may be all connected to the Tracker server 60, to establish the peer-to-peer network by using the Tracker server 60. The target client device 40 and the other client devices 50 obtain the fragment file list and the segment corresponding to each fragment file that are provided by the CDN server 80. The target client device 40 and the other client devices 50 may obtain the segment corresponding to each fragment file from the peer-to-peer network. The target client device 40 and the other client devices 50 each may be an electronic device, for example, a smartphone, or a tablet computer.

The network 30 or the network 70 includes various network devices such as a router, a switch, a multiplexer, a hub, a modem, a bridge, a repeater, a firewall, and/or a proxy device. The network may include a physical link, for example, a coaxial cable link, a twisted-pair cable link, an optical fiber link, or a combination thereof. The network 30 may include a radio link, for example, a cellular link, a satellite link, or a Wi-Fi link.

Embodiment 1

Figure 2:
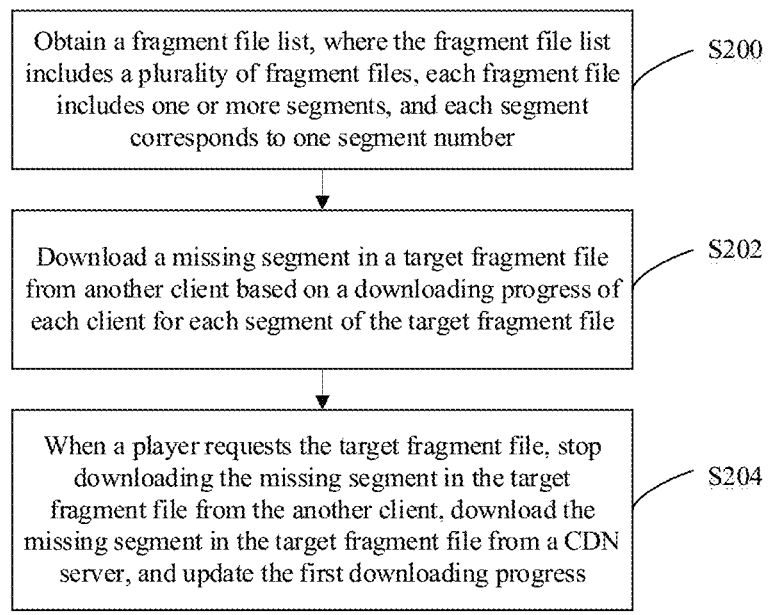
FIG. 2 is an example of a flowchart of a peer-to-peer network scheduling method according to Embodiment 1 of this application.

FIG. 2 is an example of a flowchart of a peer-to-peer network scheduling method according to Embodiment 1 of this application. This embodiment may be performed in a target client device 40. It may be understood that the flowchart in this method embodiment is not used to limit a sequence of performing steps.

As shown in FIG. 2, the peer-to-peer network scheduling method may include steps S200 to S204.

Step S200: Obtain a fragment file list, where the fragment file list includes a plurality of fragment files, each fragment file includes one or more segments, and each segment corresponds to one segment number.

The target client device 40 may obtain the fragment file list from a CDN server 80. For example, after the target client device 40 and the CDN server 80 establish a communication connection, the target client device 40 may send an obtaining request for the fragment file list to the CDN server 80. After receiving the obtaining request, the CDN server 80 may respond to the obtaining request, and return the fragment file list to the target client device 40.

The fragment file in the fragment file list may be provided by an origin server 90. The fragment file may be a file obtained after the origin server 90 performs fragmentation processing on obtained live streaming data. For example, after obtaining the live streaming data, the origin server 90 may perform fragmentation processing on the live streaming data based on predetermined duration, to obtain the plurality of fragment files. When the predetermined duration is 1 second, each time live streaming data whose duration is 1 second is obtained, the origin server 90 may generate one fragment file whose duration is 1 second.

After obtaining the fragment file list, the target client device 40 may split each fragment file in the fragment file list into segments, and assign a corresponding segment number to each segment. For example, the target client device 40 may split each fragment file into four segments, and segment numbers of the four segments may be 01, 02, 03, and 04.

Figure 3:
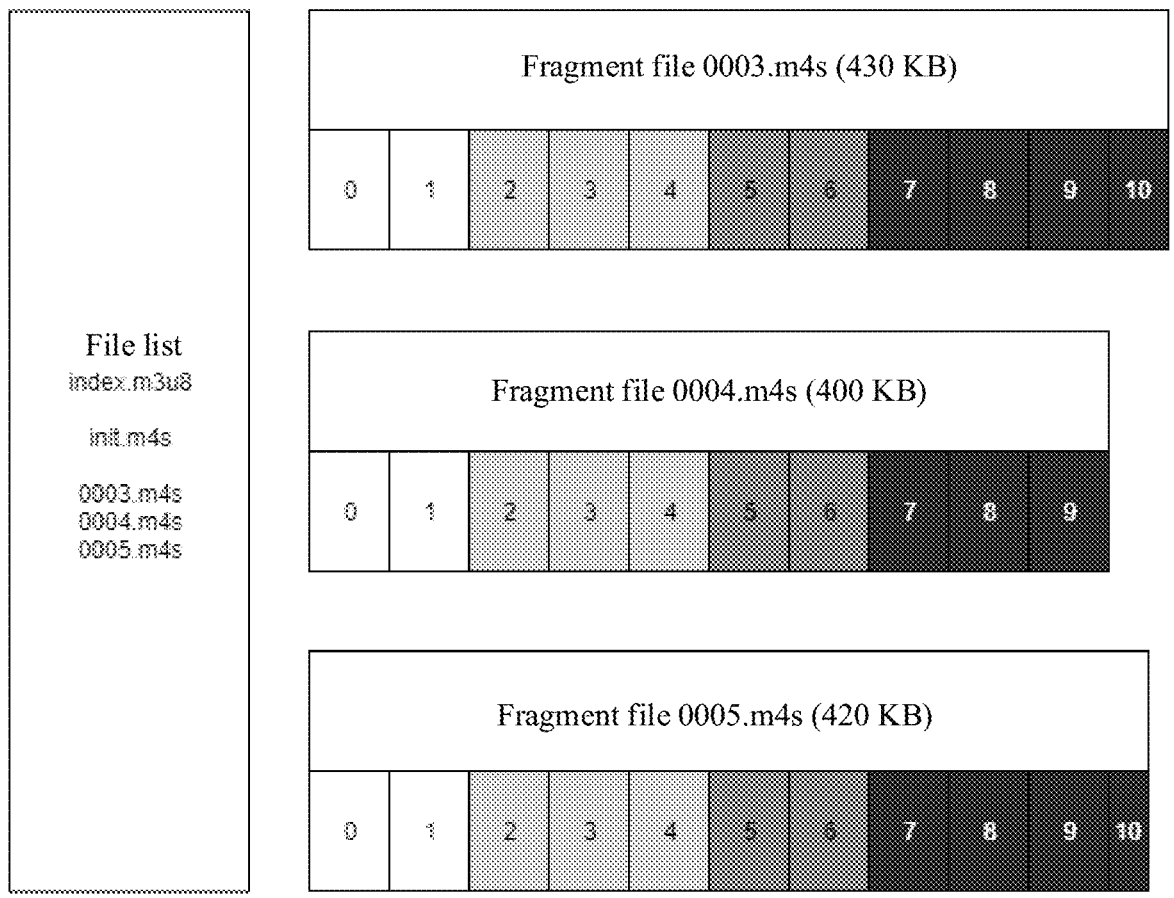
FIG. 3 is an example of a file list diagram according to Embodiment 1 of this application.

For ease of understanding, as shown in FIG. 3, a file list diagram is provided in this embodiment, and a file list in the file list diagram includes a fragment file 0003 (size: 430 K), a fragment file 0004 (size: 400 K), and a fragment file 0005 (size: 420 K). The target client device may first split each fragment file into several small data blocks whose size is 40 K, and then group the several small data blocks into four groups, to obtain four segments of each fragment file. The fragment file 0003 is used as an example, and the fragment file 0003 may be split into 10 small data blocks. The 10 small data blocks are grouped into four segments. The first segment includes a small data block 0 and a small data block 1, the second segment includes a small data block 2, a small data block 3, and a small data block 4, the third segment includes a small data block 5 and a small data block 6, and the fourth segment includes a small data block 7, a small data block 8, a small data block 9, and a small data block 10.

Step S202: Download a missing segment in a target fragment file from another client device based on a downloading progress of each client device for each segment of the target fragment file.

For example, step S202 may further include step S202A to step S202C.

Step S202A: Download each segment in the target fragment file based on the fragment file list, and obtain a first downloading progress of downloading each fragment by the client device (that is, the target client device 40).

After obtaining the fragment file list, the target client device 40 may download each segment in the target fragment file through various channels, for example, download some segments from the CDN server 80, download some segments from the origin server 90, and download some segments from another client device 50. The first downloading progress of downloading each fragment by the target client device 40 is a downloading progress obtained regardless of a channel.

For example, the target fragment file includes a segment X1, a segment X2, a segment X3, and a segment X4. The first downloading progress of downloading each fragment by the target client device 40 is as follows:

For the segment X1, a downloading progress of downloading the segment X1 by the target client device 40 is 30%.

For the segment X2, a downloading progress of downloading the segment X2 by the target client device 40 is 0%.

For the segment X3, a downloading progress of downloading the segment X3 by the target client device 40 is 0%.

For the segment X4, a downloading progress of downloading the segment X4 by the target client device 40 is 0%.

Step S202B: Request a second downloading progress of each fragment of the target fragment file from another client device in a peer-to-peer network.

The peer-to-peer network (P2P network) includes the target client device 40 and the another client device, and the another client device includes a plurality of other client devices 50 connected to the target client device. In other words, the another client device 50 and the target client device 40 are both located in the P2P network, and are peer nodes in the P2P network.

The plurality of another client device 50A and another client device 50B are used as an example. Second downloading progress of downloading each fragment by the another client device 50A and the another client device 50B are respectively as follows:

Another client device 50A:

For the segment X1, a downloading progress of downloading the segment X1 by the another client device 50A is 50%.

For the segment X2, a downloading progress of downloading the segment X2 by the another client device 50A is 0%.

For the segment X3, a downloading progress of downloading the segment X3 by the another client device 50A is 40%.

For the segment X4, a downloading progress of downloading the segment X4 by the another client device 50A is 100%.

Another client device 50B:

For the segment X1, a downloading progress of downloading the segment X1 by the another client device 50B is 20%.

For the segment X2, a downloading progress of downloading the segment X2 by the another client device 50B is 100%.

For the segment X3, a downloading progress of downloading the segment X3 by the another client device 50B is 0%.

For the segment X4, a downloading progress of downloading the segment X4 by the another client device 50B is 0%.

In response to a request of the target client device 40, the another client device 50A returns, to the target client device 40, the downloading progresses of downloading the segment X1, the segment X2, the segment X3, and the segment X4 by the another client device 50A. Similarly, in response to a request of the target client device 40, the another client device 50B returns, to the target client device 40, the downloading progresses of downloading the segment X1, the segment X2, the segment X3, and the segment X4 by the another client device 50B.

Figure 4:
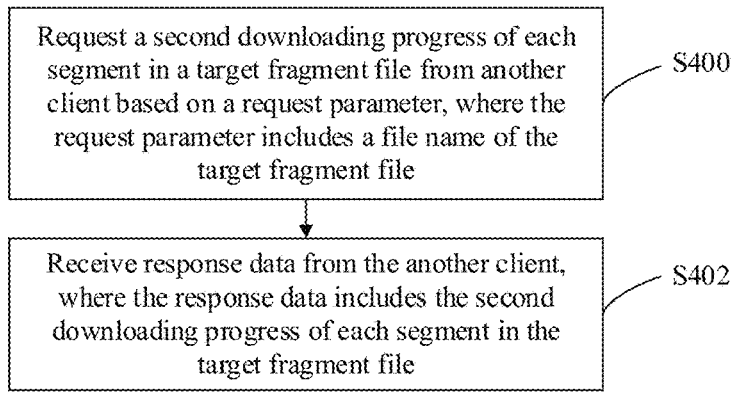
FIG. 4 is an example of a diagram of a specific procedure of step S202 in FIG. 2.

In an example embodiment, as shown in FIG. 4, step S202B may further include step S400 and step S402. Step S400: Request the second downloading progress of each segment in the target fragment file from the another client device based on a request parameter, where the request parameter includes a file name of the target fragment file. Step S402: Receive response data from the another client device, where the response data includes the second downloading progress of each segment in the target fragment file. The target client device 40 may obtain a file name of the target fragment file from the fragment file list, to request the second downloading progress (a progress of downloading each segment in the target fragment file by the another client device 50) of each segment in the target fragment file from the another client device 50 based on the file name. In this embodiment, a downloading progress of downloading the target fragment file by the another client device 50 is queried based on the file name of the target fragment file, to improve resource utilization in the peer-to-peer network, and reduce the data distribution pressure of the CDN server 80.

Step S202C: Download the missing segment in the target fragment file from the another client device based on the first downloading progress and the second downloading progress.

To play a live streaming video, complete data corresponding to the live streaming video needs to be obtained. To reduce the data distribution pressure of the CDN server 80, in addition to requesting to download some segments in the target fragment file from the CDN server 80, the target client device 40 further obtains some segments from the peer-to-peer network. In this embodiment, the target client device 40 may determine, based on the first downloading progress and the second downloading progress (the progress of downloading each segment in the target fragment file by other client devices in the peer-to-peer network), another specific client device among a plurality of client devices in the peer-to-peer network from which the missing segment in the target fragment file may be downloaded. It should be understood that as the target client device continuously downloads the segment in the target fragment file, the first downloading progress also changes accordingly.

For ease of understanding, in this embodiment, a downloading progress of downloading each segment in the target fragment file by the target client device 40 and a plurality of other client devices 50 (for example, another client device 50A, another client device 50B, and another client device 50C) is provided. Details are shown in Table 1.

TABLE 1

| Client device | Segment X1 | Segment X2 | Segment X3 | Segment X4 |
|---|---|---|---|---|
| Target client device 40 | 30% | 0% | 0% | 0% |
| Another client device 50A | 50% | 0% | 40% | 100% |
| Another client device 50B | 20% | 100% | 0% | 0% |
| Another client device 50C | 0% | 90% | 80% | 50% |

If the progress of downloading the segment X1 by the target client device 40 is 30%, and the progress of downloading the segment X1 by the another client device 50A is 50%, the target client device 40 may request data of a part of the segment X1 from 30% to 50% from the another client device 50A. Similarly, the target client device may request to download all data of the segment X2 from the another client device 50B, request to download all data of the segment X3 from the another client device 50C, and request to download all data of the segment X4 from the another client device 50A.

In an example embodiment, the peer-to-peer network scheduling method further includes: responding to a request of the another client device, and sending a corresponding segment to the another client device; and when a quantity of bytes sent to the another client device is greater than a preset threshold, refusing to respond to a data request of the another client device. In this embodiment, the preset threshold value is used as a limit, to refuse to continue to send data, thereby effectively ensuring user experience.

In an example embodiment, the peer-to-peer network scheduling method further includes: if the second downloading progress of each segment in the target fragment file is not greater than the first downloading progress, requesting the second downloading progress of each segment in the target fragment file from the another client device again.

As shown in Table 1, after the target client device 40 downloads the data of the part of the segment X1 from 30% to 50% from the another client device 50A, a current progress of the segment X1 is 50%. Then in Table 1, the progress of downloading the segment X1 by the another client device 50A is not greater than the progress of downloading the segment X1 by the target client device 40. In this case, the target client device 40 may request the second downloading progress of each segment in the target fragment file from the another client device in the peer-to-peer network, to determine whether a progress of downloading the segment X1 by the another client device is greater than the progress of downloading the segment X1 by the target client device 40. In this embodiment, the missing segment in the target fragment file may be downloaded from the another client device, to reduce the data distribution pressure of the CDN server 80, and increase the speed of obtaining the another segment in the target fragment file by the target client device 40.

Step S204: When a player requests the target fragment file, stop downloading the missing segment in the target fragment file from the another client device, and download the missing segment in the target fragment file from the CDN server.

The target client device 40 stores a downloaded complete fragment file in a cache of the player. When the player requests the target fragment file, it indicates that playing of a fragment file stored in the cache is completed. To ensure smooth playing of the live streaming video, if downloading of a segment in the target fragment file is not completed, downloading of the missing segment in the target fragment file from the another client device is stopped, the missing segment in the target fragment file is downloaded from the CDN server, and the first downloading progress is updated. In this embodiment, the target client device 40 may adjust a segment downloading policy based on the downloading progress (the first downloading progress) of downloading each fragment by the target client device 40 and the downloading progress (the second downloading progress) of downloading each fragment by the another client device 50, to automatically download the missing segment in the target fragment file from the another client device 50, and improve data transmission efficiency of the P2P network. In addition, in the foregoing process, a Tracker server does not need to give an indication, thereby effectively reducing a computing amount and resource consumption of the Tracker server.

In an example embodiment, step S204 may further include: when the target fragment file is completely downloaded, playing the target fragment file by using the player. In this embodiment, the missing segment in the target fragment file may be downloaded from the CDN server, to ensure smooth playing of the live streaming video. In this way, a problem that live streaming is interrupted for a long period of time is avoided, and playing stability of the live streaming video is improved.

In an example embodiment, step S204 may further include: splitting the target fragment file at a predetermined time frequency, to obtain a plurality of partial fragments, where the plurality of partial fragments include a first partial fragment and a second partial fragment; and when the first partial fragment is completely downloaded, playing the first partial fragment by using the player. Initial playing is usually slow during live streaming (to be specific, the player is just started, a network buffer is empty, and a long time period elapses before an image and a sound appear in the player). In view of this problem, the target client device 40 may further split the target fragment file, for example, split, into two partial fragments whose duration is 0.5 second, a target fragment file whose duration is 1 second. When a first partial fragment whose duration is 0.5 second is completely downloaded, the target client device 40 may play, by using the player, the partial fragment whose duration is 0.5 second. In other words, the target fragment file can be played before being completely downloaded (that is, playing while downloading). In some other embodiments, there is also a high latency during live streaming (to be specific, a single segment file is too large, and a downloading time period is too long, resulting in the high latency). In view of this problem, the target client device 40 may allow the single fragment file to start with a non-key frame, to ensure that during live streaming, no live streaming latency is caused when a specific segment is not downloaded. Specifically, the origin server 90 may also split the target fragment file into a plurality of small segment files. When the origin server 90 receives a complete small segment file, the origin server 90 may send the small segment file to the CDN server 80, so that the CDN server 80 distributes the small segment file to each client device, to resolve a problem of a large latency caused when the single segment file is too large.

Figure 5:
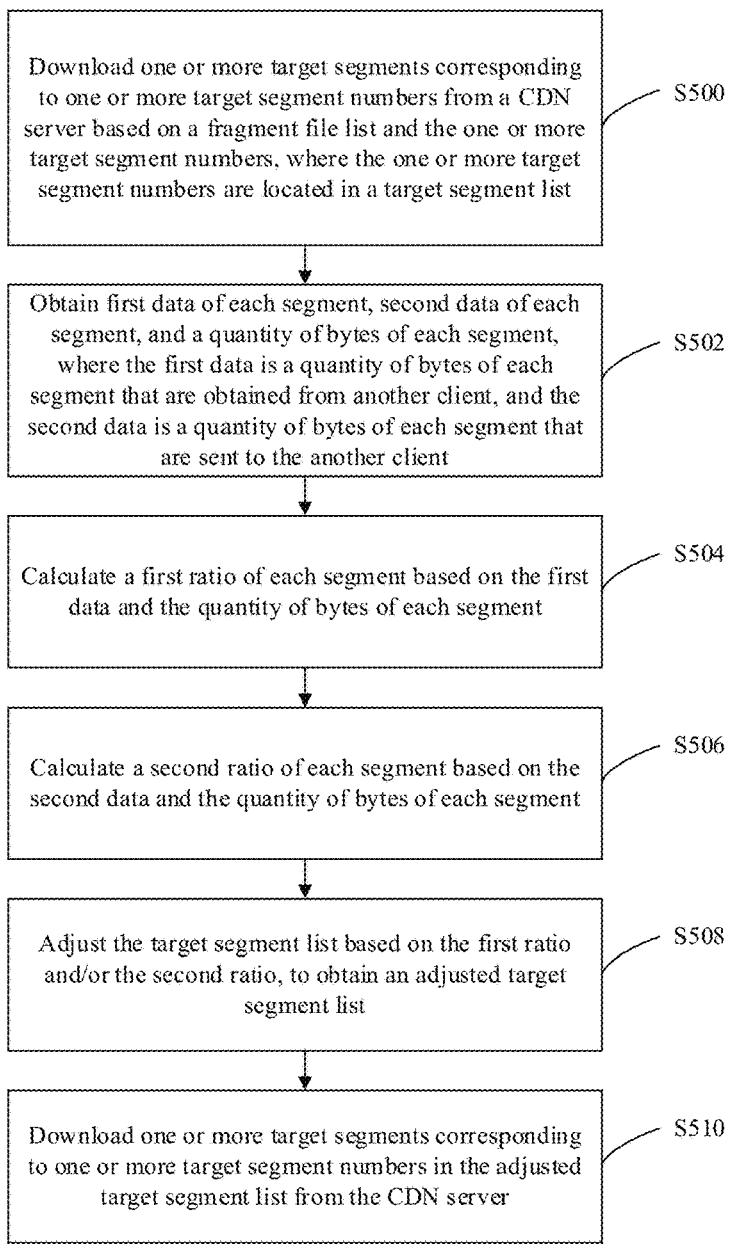
FIG. 5 is an example of a flowchart of another peer-to-peer network scheduling method according to Embodiment 1 of this application.

In an example embodiment, as shown in FIG. 5, the peer-to-peer network scheduling method further includes step S500 to step S504.

Step S500: Download one or more target segments corresponding to one or more target segment numbers from the CDN server based on the fragment file list and the one or more target segment numbers, where the one or more target segment numbers are located in a target segment list.

After establishing a connection to the CDN server 80, the target client device 40 may request, from the CDN server 80 based on one or more target segment numbers in a target segment list that may be generated based on the fragment file list, to download one or more target segments corresponding to the one or more target segment numbers. It should be noted that the target segment number may be a segment number corresponding to a segment that the target client device requests to download from the CDN server 80 at the first time. For example, when the target client device 40 requests to download the segment from the CDN server 80 at the first time, the target client device 40 randomly selects one or more segment numbers from the fragment file list. The target client device 40 may generate the target segment list based on information about the fragment file list. A segment number in the target segment list is referred to as a target segment number.

For example, the target client device 40 may download one or more target segments corresponding to one or more target segment numbers from the CDN server. The target client device 40 may further obtain one or more other segments in a target fragment file other than the one or more target segments from another client device 50 in the P2P network. It should be noted that, the target fragment file includes one or more segments, and the target segment is a segment in the target fragment file. For example, a target fragment file 0006 includes four segments, and if the first segment is the target segment, the second segment, the third segment, and the fourth segment are other segments.

Step S502: Obtain first information, second information, and a quantity of bytes of each segment. The first information indicates a quantity of bytes that are obtained/downloaded from the another client device, and the second information indicates a quantity of bytes that are sent/uploaded to the another client device.

The peer-to-peer network scheduling method in this embodiment aims to reduce an amount of data carried by the CDN server 80, thereby reducing data distribution pressure of the CDN server 80. To reduce the amount of data carried by the CDN server 80 as much as possible, in this embodiment, the target segment number may be further adjusted, to reduce an amount of data existing when the target client device 40 downloads a segment from the CDN server 80. Specifically, when obtaining each segment in the target fragment file, the target client device 40 may collect statistics about the following:
1. First information L: a quantity of bytes that are obtained from the another client device 50;
2. Second information M: a quantity of bytes that are sent to the another client device 50; and
3. Quantity of bytes N of each segment.

The target client device 40 may calculate two ratios associated with each segment based on the three pieces of data. Details are shown in, for example, step S504 and step S506.

Step S504: Calculate a first ratio of each segment based on the first information and the quantity of bytes of each segment.

A first ratio a is a ratio of the quantity of bytes of each segment that are obtained from the another client device 50 to the quantity of bytes of each segment. That is, $a=L/N$.

Step S506: Calculate a second ratio of each segment based on the second information and the quantity of bytes of each segment.

A second ratio b is a ratio of the quantity of bytes of each segment that are sent to the another client device 50 to the quantity of bytes of each segment. That is, $b=M/N$.

Step S508: Adjust the target segment list based on the first ratio and/or the second ratio, to obtain the adjusted target segment list.

The inventor finds that a connection success rate and a transmission rate between client devices are uncontrollable. (1) The connection success rate is uncontrollable: There may be a plurality of network address translation (NAT) gateways between one client device and another client device, a type of the NAT gateways are uncontrollable, and a type combination of the NAT gateways affects whether the two client devices can be connected successfully. (2) The transmission rate is uncontrollable: A congested state of a network changes with a busy time period and an idle time period, a network transmission rate changes with a situation of whether cross-province transmission is performed, whether cross-operator transmission is performed, or the like, and bandwidth that can be used by a client device changes with whether a user uses downloading software in a same network. Therefore, a transmission rate between two client devices is uncontrollable.

Because the connection success rate and the transmission rate between client devices are uncontrollable, it is necessary to adjust, in a timely manner, a policy of obtaining a segment by each client device. For example, whether the target client device 40 needs to obtain a segment from the CDN server 80 or another client device is adjusted. Therefore, in this embodiment, the target segment list is introduced, a segment corresponding to a target segment number located in the target segment list is obtained from the CDN server 80, and a segment corresponding to another segment number not located in the target segment list may be obtained from the another client device. Therefore, the target segment list is adjusted, to adjust a policy of obtaining a segment by the target client device 40. Specifically, the target client device 40 may adjust the target segment list, for example, remove the one or more target segment numbers from the target segment list and/or add segment numbers of the one or more other segments corresponding to the target fragment file to the target segment list.

To adjust the target segment list, all other client devices 50 (which are referred to as local P2P networks) to which the target client device 40 is currently connected needs to be analyzed (for example, a capability of the current P2P network to provide a segment is analyzed), and a segment number for which the target client device 40 is responsible is adjusted based on an analysis result. Specifically, the target client device 40 may perform analysis based on the first ratio a and the second ratio b. The following two conclusions are obtained by analyzing the first ratio a and the second ratio b:

Conclusion 1: Step S506 includes: if a first ratio of a segment is less than a first preset ratio, and a segment number of the segment is not a target segment number in the target segment list, adding the segment number of the segment to the target segment list. A segment X is used as an example. If a first ratio of the segment X is less than the first preset ratio, it may be considered to add a segment number of the segment X to the target segment list. That is, if the first ratio a of the segment X is very small (for example, when the first ratio is less than the first preset ratio), it indicates that a capability of the current P2P network to provide the segment is very weak. In this case, in this embodiment, the segment number of the segment X may be added to the target segment list. That is, the target client device 40 is responsible for downloading the segment X from the CDN server 80, thereby improving distribution efficiency of the segment X in the entire P2P network. For example, the target client device 40 is connected to 12 other client devices. If two other client devices in the 12 other client devices are responsible for downloading the segment X from the CDN server 80, but transmission rates of the two other client devices and the target client device 40 are all very slow and consequently, the target client device 40 cannot obtain all data of the segment X from the two other client devices, the target client device 40 tends to directly download the segment X from the CDN server 80, that is, adjust the target segment list, to add the segment number of the segment X to the target segment list.

Conclusion 2: Step S506 further includes: if a second ratio of a segment is less than a second preset ratio, and a segment number of the segment is a target segment number in the target segment list, removing the target segment number corresponding to the segment from the target segment list. The segment X is used as an example. If a second ratio of the segment X is less than the second preset ratio, it may be considered to remove a segment number of the segment X from the target segment list. That is, if the second ratio b of the segment X is very small (for example, when the second ratio is less than the second preset ratio), it indicates that a capability of the current local P2P network to provide the segment is surplus. In this case, in this embodiment, the segment number of the segment X may be removed from the target segment list. That is, the target client device 40 downloads the segment from the P2P network, thereby reducing data distribution pressure of the CDN server 80. For example, the target client device 40 is connected to 12 other client devices. If eight other client devices in the 12 other client devices are responsible for obtaining the segment X from the CDN server 80, and although the eight other client devices performs transmission to the target client device 40 too slowly, the target client device 40 can obtain the complete segment X in a limited time when all segments X obtained by the eight other client devices are added, the target client device 40 tends not to download the segment X from the CDN server 80, that is, remove the segment number of the segment X from a list for which the target client device 40 is responsible.

For ease of understanding, in this embodiment, a quantity of bytes (that is, an uploading amount) that are of each segment in the target fragment file of the target client device 40 and that are requested by the another client device and a quantity of bytes obtained from the another client device 50 (an amount downloaded from a peer) are provided, as shown in Table 2. For better understanding, data in Table 2 is represented as a percentage. The quantity N of bytes of the segment is 100%.

TABLE 2

| Segment | Uploading amount | Amount downloaded from a peer | Amount downloaded from a CDN |
|---|---|---|---|
| X0 | 354% | 0% | 100% |
| X1 | 0% | 20% | 80% |
| X2 | 10% | 0% | 100% |
| X3 | 0% | 100% | 0% |

In Table 2, target segments are the segment X0 and the segment X2, and the following conclusions can be obtained from Table 2:

(1) For the segment X0, a current state is maintained, because a capability of the P2P network to provide the segment is very weak.
(2) For the segment X1, a segment number tends to be added to the target segment list, because a capability of the P2P network to provide the segment is very weak.
(3) For the segment X2, a segment number tends to be removed from the target segment list, because a capability of the P2P network to provide the segment is surplus.
(4) For the segment X3, a current state tends to be maintained, because a capability of the P2P network to provide the segment is surplus.

The inventor further finds that there may be such a situation: A plurality of client devices are responsible for a segment (for example, the segment X2), but all the client devices remove the segment (the segment X2) from lists for which the client devices are respectively responsible, resulting in a change from one extreme to another extreme. For example, there are 10000 client devices in the P2P network, and it is found that the segment X2 is abundant. Assuming that the 10000 client devices simultaneously remove the segment X2 from segment lists for which the 10000 client devices are responsible, the segment X2 becomes scarce immediately in the P2P network.

To avoid the foregoing situation, in this embodiment, when a segment addition operation or a segment removal operation is performed on the target segment list, a probability of actually performing the addition operation or the removal operation may be obtained in advance, and a preset value (for example, 0.25, which means that, it is found through calculation that each time a client device needs to "add a segment to a segment list for which the client device is responsible" or "delete a segment from a segment list for which the client device is responsible", the probability of actually performing the addition operation or the removal operation is only 25%) may be configured based on the probability.

Step S510: Download one or more target segments corresponding to one or more target segment numbers in the adjusted target segment list from the CDN server.

For example, the one or more target segment numbers in the target segment list existing before adjustment are Y2 and Y3.

If the one or more target segment numbers in the adjusted target segment list are Y2 and Y4, the target client device 40 downloads a target segment corresponding to the target segment number Y2 and a target segment corresponding to the segment number Y4 from the CDN server 80.

In this embodiment, when the connection success rate and the transmission rate between client devices are uncontrollable, the client device can automatically adjust a segment downloading policy of the client device based on a data obtaining capability of the P2P network, to adapt to a change in the connection success rate and the transmission rate, thereby improving data transmission efficiency of the P2P network. In addition, in the foregoing process, a Tracker server does not need to give an indication, thereby effectively reducing a computing amount and resource consumption of the Tracker server.

Figure 6:
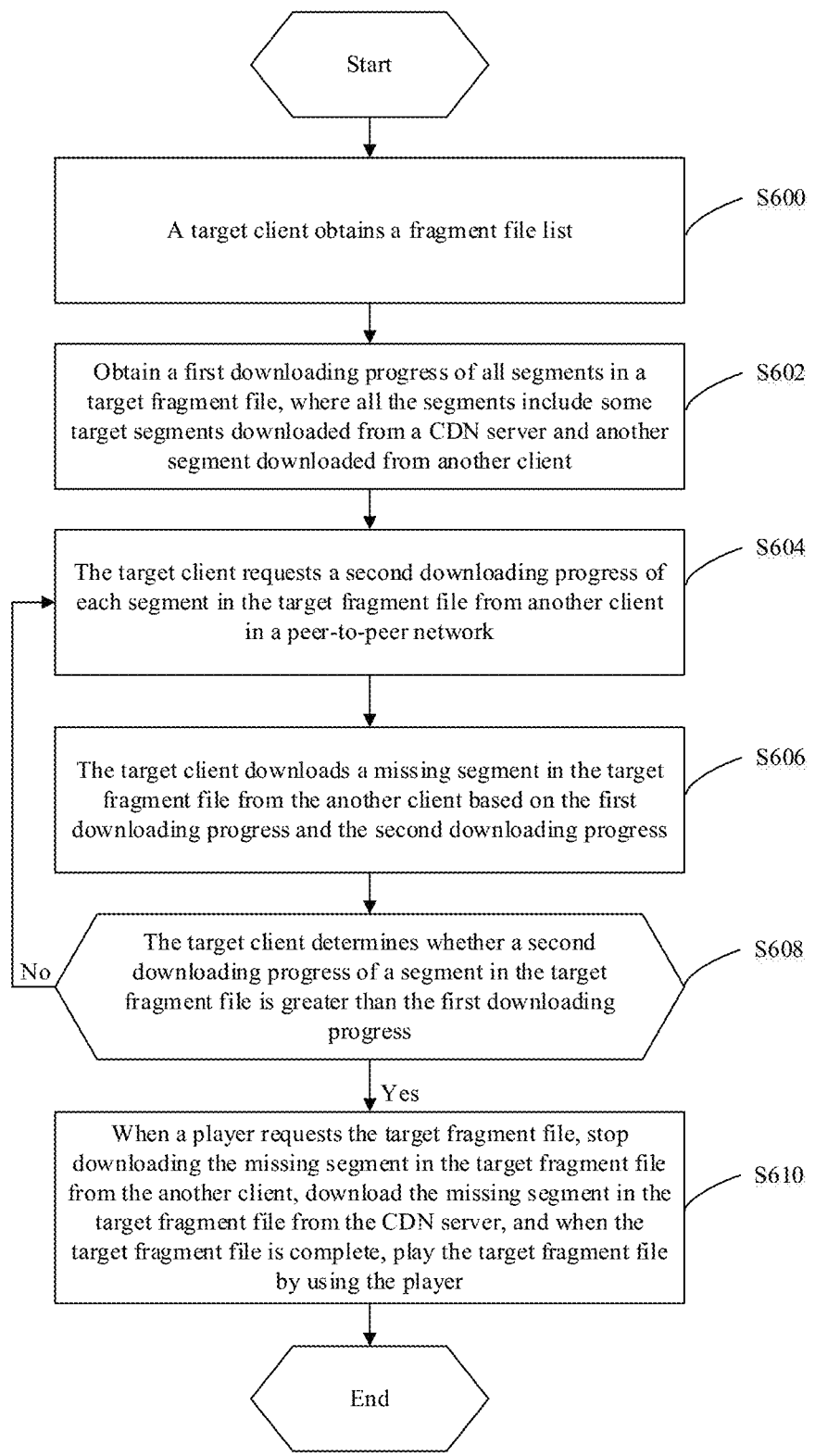
FIG. 6 is an example of a diagram of a specific procedure of another peer-to-peer network scheduling method according to Embodiment 1 of this application.

For ease of understanding, an embodiment further provides a specific flowchart of a peer-to-peer network scheduling method, as shown in FIG. 6.

Step S600: A target client device 40 obtains a fragment file list.

Step S602: Obtain a first downloading progress of each segment in the target fragment file, where all the segments include some target segments downloaded from a CDN server 80 and another segment downloaded from another client device.

Step S604: The target client device 40 requests a second downloading progress of each segment in the target fragment file from another client device 50 in a peer-to-peer network.

Step S606: The target client device 40 downloads a missing segment in the target fragment file from the another client device based on the first downloading progress and the second downloading progress.

Step S608: The target client device 40 determines whether a second downloading progress of a segment in the target fragment file is greater than the first downloading progress; and performs step S604 again if the second downloading progress is not greater than the first downloading progress.

Step S610: When a player requests the target fragment file, stop downloading the missing segment in the target fragment file from the another client device 50, download the missing segment in the target fragment file from the CDN server 80, and when the target fragment file is complete, play the target fragment file by using the player.

Embodiment 2

Figure 7:
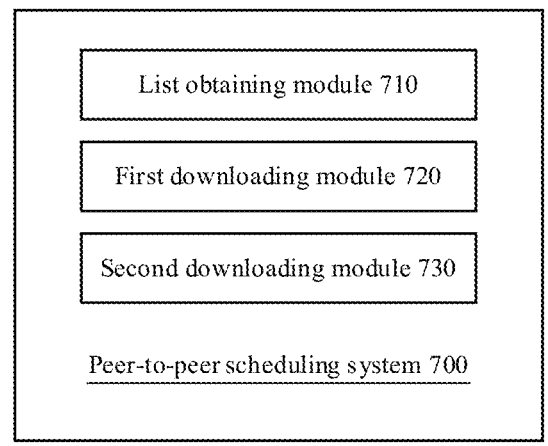
FIG. 7 is an example of a schematic diagram of a hardware architecture of a computer device suitable for implementing a peer-to-peer network scheduling method according to Embodiment 2 of this application.

FIG. 7 is an example of a block diagram of a peer-to-peer network scheduling system according to Embodiment 2 of this application. The peer-to-peer network scheduling system may be divided into one or more program modules. The one or more program modules are stored in a storage medium, and are executed by one or more processors, to complete this embodiment of this application. The program module in this embodiment of this application is a series of computer program instruction segments that can be used to complete a specified function. The following specifically describes a function of each program module in this embodiment.

As shown in FIG. 7, a peer-to-peer network scheduling system 700 may include a list obtaining module 710, a first downloading module 720, and a second downloading module 730.

The list obtaining module 710 is configured to obtain a fragment file list. The fragment file list includes a plurality of fragment files, each fragment file includes one or more segments, and each segment corresponds to one segment number.

The first downloading module 720 is configured to download a missing segment in a target fragment file from another client device based on a downloading progress of each client device for each segment of the target fragment file.

In an example embodiment, the first downloading module 720 is further configured to: download each segment in the target fragment file based on the fragment file list, and obtain a first downloading progress of downloading each fragment by the client device; request a second downloading progress of each fragment of the target fragment file from another client device in a peer-to-peer network; and download the missing segment in the target fragment file from the another client device based on the first downloading progress and the second downloading progress.

In an example embodiment, the first downloading module 720 is further configured to: request the second downloading progress of each segment in the target fragment file from the another client device based on a request parameter, where the request parameter includes a file name of the target fragment file; and receive response data from the another client device, where the response data includes the second downloading progress of each segment in the target fragment file.

The second downloading module 730 is configured to: when a player requests the target fragment file, stop downloading the missing segment in the target fragment file from the another client device, and download the missing segment in the target fragment file from a CDN server.

In an example embodiment, the peer-to-peer network scheduling system further includes a playing module. The playing module is configured to: when the target fragment file is complete, play the target fragment file by using the player.

In an example embodiment, the playing module is further configured to: split the target fragment file at a predetermined time frequency, to obtain a plurality of partial fragments, where the plurality of partial fragments include a first partial fragment and a second partial fragment; and when the first partial fragment is complete, play the first partial fragment by using the player.

In an example embodiment, the peer-to-peer network scheduling system further includes a request module. The request module is configured to: if the second downloading progress of each segment in the target fragment file is not greater than the first downloading progress, request the second downloading progress of each segment in the target fragment file from the another client device again.

In an example embodiment, the peer-to-peer network scheduling system further includes a response module. The response module is configured to: respond to a request of the another client device, and send a corresponding segment to the another client device; and when a quantity of bytes sent to the another client device is greater than a preset threshold, refuse to respond to a data request of the another client device.

In an example embodiment, the peer-to-peer network scheduling system further includes an adjustment module. The adjustment module is configured to: download one or more target segments corresponding to one or more target segment numbers from the CDN server based on the fragment file list and the one or more target segment numbers, where the one or more target segment numbers are located in a target segment list; obtain first data of each segment, second data of each segment, and a quantity of bytes of each segment, where the first data is a quantity of bytes of each segment that are obtained from the another client device, and the second data is a quantity of bytes of each segment that are sent to the another client device; calculate a first ratio of each segment based on the first data and the quantity of bytes of each segment; calculate a second ratio of each segment based on the second data and the quantity of bytes of each segment; adjust the target segment list based on the first ratio and/or the second ratio, to obtain an adjusted target segment list; and download one or more target segments corresponding to one or more target segment numbers in the adjusted target segment list from the CDN server.

In an example embodiment, the adjustment module is further configured to: if a first ratio of a segment is less than a first preset ratio, and a segment number of the segment is not a target segment number in the target segment list, add the segment number of the segment to the target segment list; or if a second ratio of a segment is less than a second preset ratio, and a segment number of the segment is a target segment number in the target segment list, remove the target segment number corresponding to the segment from the target segment list.

Embodiment 3

Figure 8:
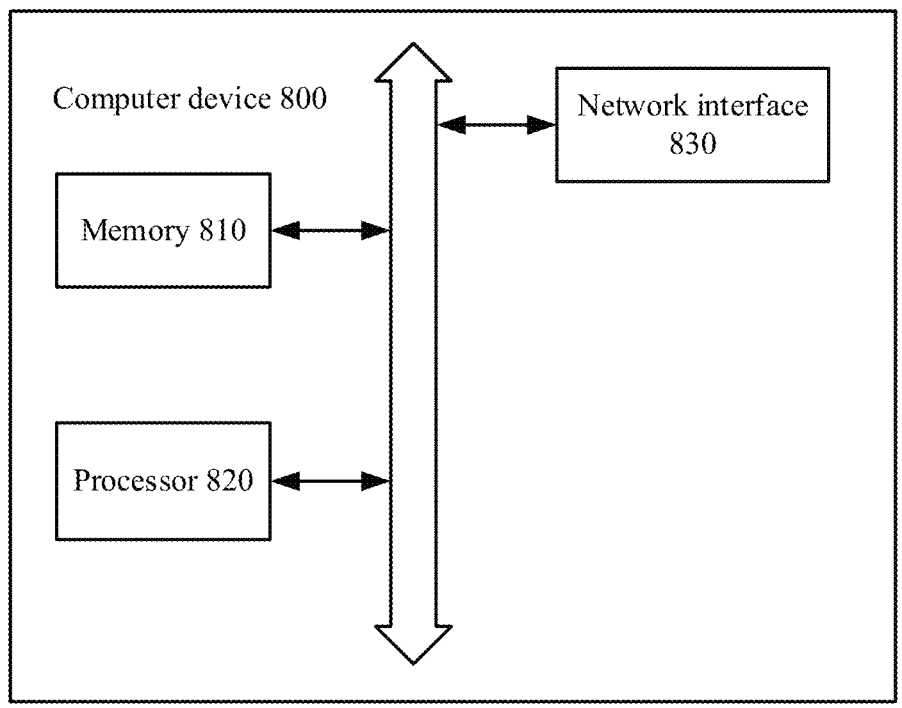
FIG. 8 is an example of a schematic diagram of a hardware architecture of a computer device suitable for implementing a peer-to-peer network scheduling method according to Embodiment 3 of this application.

FIG. 8 is an example of a schematic diagram of a hardware architecture of a computer device suitable for implementing a peer-to-peer network scheduling method according to Embodiment 3 of this application. In this embodiment, a computer device 800 may be the target client device 40 or the another client device 50 in FIG. 1. The computer device 800 is a device that can automatically calculate a value and/or process information based on an instruction that is set or stored in advance. For example, the computer device 800 may be a mobile device, a tablet device, a laptop computer, a workstation, a virtual reality device, a game device, a set top box, a digital streaming media device, a vehicle terminal, a smart television, an electronic book reader, or the like. As shown in FIG. 8, the computer device 800 includes but is not limited to a memory 810, a processor 820, and a network interface 830 that can be communicatively connected to each other through a system bus.

The memory 810 includes at least one type of computer-readable storage medium. The readable storage medium includes a flash memory, a hard disk, a multimedia card, a card-type storage (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 810 may be an internal storage module of the computer device 800, such as a hard disk or a memory of the computer device 800. In some other embodiments, the memory 810 may be an external storage device of the computer device 800, for example, a removable hard disk, a smart media card (SMC), a secure digital (SD) card, or a flash card that is disposed on the computer device 800. Certainly, the memory 810 may include both an internal storage module of the computer device 800 and an external storage device of the computer device 800. In this embodiment, the memory 810 is usually configured to store an operating system and various application software that are installed on the computer device 800, for example, program code of the peer-to-peer network scheduling method. In addition, the memory 810 may be further configured to temporarily store various types of data that has been output or is to be output.

The processor 820 may be a central processing unit (CPU), a controller, a microcontroller, a microprocessor, or another data processing chip in some embodiments. The processor 820 is usually configured to control an overall operation of the computer device 800, for example, perform control and processing related to data exchange or communication performed by the computer device 800. In this embodiment, the processor 820 is configured to run program code stored in the memory 810 or process data.

The network interface 830 may include a wireless network interface or a wired network interface, and the network interface 830 is usually configured to establish a communication link between the computer device 800 and another computer device. For example, the network interface 830 is configured to: connect the computer device 800 and an external terminal through a network, and establish a data transmission channel, a communication link, and the like between the computer device 800 and the external terminal. The network may be a wireless or wired network, for example, an Intranet, the Internet, a global system for mobile communications (GSM), a wideband code division multiple access (WCDMA), a 4G network, a 5G network, Bluetooth, or Wi-Fi.

It should be noted that FIG. 8 shows only a computer device with the components 1010-1030. However, it should be understood that implementation of all the shown components is not required, and more or fewer components may be alternatively implemented.

In this embodiment, the peer-to-peer network scheduling method stored in the memory 810 may be further divided into one or more program modules to be executed by one or more processors (the processor 820 in this embodiment), so as to complete this embodiment of this application.

Embodiment 4

This embodiment further provides a computer-readable storage medium. The computer-readable storage medium stores a computer program. When the computer program is executed by a processor, the steps of the peer-to-peer network scheduling method in embodiments are implemented.

In this embodiment, the computer-readable storage medium includes a flash memory, a hard disk, a multimedia card, a card-type storage (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of a computer device, for example, a hard disk or a memory of the computer device. In some other embodiments, the computer-readable storage medium may be an external storage device of the computer device, for example, a removable hard disk, a smart media card (SMC), a secure digital (SD) card, or a flash card that is disposed on the computer device. Certainly, the computer-readable storage medium may include both an internal storage unit of the computer device and an external storage device of the computer device. In this embodiment, the computer-readable storage medium is usually configured to store an operating system and various application software that are installed on the computer device, for example, program code of the peer-to-peer network scheduling method in embodiments. In addition, the computer-readable storage medium may be further configured to temporarily store various types of data that has been output or is to be output.

Clearly, a person skilled in the art should understand that the foregoing modules or steps in embodiments of this application may be implemented by using a general computing apparatus. The modules or steps may be integrated into a single computing apparatus or distributed in a network including a plurality of computing apparatuses. Optionally, the modules or steps may be implemented by using program code that can be executed by the computing apparatus. Therefore, the modules or steps may be stored in a storage apparatus for execution by the computing apparatus. In addition, in some cases, the shown or described steps may be performed in a sequence different from the sequence herein. Alternatively, the modules or steps may be separately made into integrated circuit modules. Alternatively, a plurality of modules or steps in the modules or steps are made into a single integrated circuit module for implementation. In this way, a combination of any specific hardware and software is not limited in embodiments of this application.

The foregoing descriptions are merely some embodiments of this application, and are not intended to limit the scope of this application. Any equivalent structure or equivalent process change made by using the content of the specification and the accompanying drawings of this application, or when directly or indirectly applied to other related technical fields, shall fall within the protection scope of this application.

What is claimed is:

1. A peer-to-peer network scheduling method, applied to a client device in a peer-to-peer (P2P) network, comprising:
obtaining a fragment file list, wherein the fragment file list comprises information about a plurality of fragment files, each of the plurality of fragment files comprises one or more segments, and each of the one or more segments corresponds to a segment number;
determining at least one other client device in the P2P network from which a segment of a target fragment file is to be downloaded based on a downloading progress of downloading each segment of the target fragment file by each of a plurality of client devices in the P2P network,
wherein the determining at least one other client device in the P2P network further comprises:
obtaining a first downloading progress of downloading each segment by the client device,
requesting a second downloading progress of downloading each segment of the target fragment file by the at least one other client devices in the P2P network,
determining that the second downloading progress of downloading each segment of the target fragment file is not greater than the first downloading progress, and
requesting again, from the at least one other client device, the second downloading progress of downloading each segment of the target fragment file by the at least one other client device;
downloading the segment of the target fragment file from the at least one other client device; and
stopping downloading the segment of the target fragment file from the at least one other client device, and downloading the segment of the target fragment file from a content delivery network (CDN) server in response to detecting that a player requests the target fragment file.

2. The peer-to-peer network scheduling method according to claim 1, further comprising:
playing the target fragment file by using the player when the target fragment file is completely downloaded.

3. The peer-to-peer network scheduling method according to claim 1, comprising:
splitting the target fragment file at a predetermined time frequency to obtain a plurality of partial fragments, wherein the plurality of partial fragments comprise a first partial fragment and a second partial fragment; and
playing the first partial fragment by using the player when the first partial fragment is completely downloaded.

4. The peer-to-peer network scheduling method according to claim 1, wherein the determining at least one other client device in the P2P network from which a segment of a target fragment file is to be downloaded based on a downloading progress of downloading each segment of the target fragment file by each of a plurality of client devices in the P2P network further comprises:
determining the at least one other client device based on the first downloading progress and the second downloading progress.

5. The peer-to-peer network scheduling method according to claim 1, wherein the requesting a second downloading progress of downloading each segment of the target fragment file by the at least one other client devices in the P2P network comprises:
requesting the second downloading progress of downloading each segment of the target fragment file from the at least one other client device based on a request parameter, wherein the request parameter comprises a file name of the target fragment file; and
receiving response data from the at least one other client device, wherein the response data indicate the second downloading progress of downloading each segment of the target fragment file by the at least one other client device.

6. The peer-to-peer network scheduling method according to claim 1, further comprising:
responding to a request from the at least one other client device, and sending a corresponding segment to the at least one other client device; and
in response to determining that a quantity of bytes sent to the at least one other client device is greater than a preset threshold, refusing to respond to a data request from the at least one other client device.

7. The peer-to-peer network scheduling method according to claim 1, further comprising:
obtaining first information, second information, and a quantity of bytes of each segment, wherein the first information indicates a quantity of bytes that are obtained from the at least one other client device, and the second information indicates a quantity of bytes that are sent to the at least one other client device;
calculating a first ratio associated with each segment based on the first information and the quantity of bytes of each segment;
calculating a second ratio associated with each segment based on the second information and the quantity of bytes of each segment;
adjusting a target segment list based on at least one of the first ratio or the second ratio to obtain an adjusted target segment list, wherein the target segment list is configured to comprise at least one target segment number, and at least one target segment corresponding to the at least one target segment number is to be downloaded from the CDN server; and
downloading one or more target segments corresponding to one or more target segment numbers in the adjusted target segment list from the CDN server.

8. The peer-to-peer network scheduling method according to claim 7, wherein the adjusting a target segment list based on at least one of the first ratio or the second ratio to obtain an adjusted target segment list comprises:
in response to determining that a first ratio of a particular segment is less than a first preset ratio and that a segment number corresponding to the particular segment is not a target segment number in the target segment list, adding the segment number corresponding to the particular segment to the target segment list; and
in response to determining that a second ratio of another particular segment is less than a second preset ratio and that a segment number corresponding to the another particular segment is a target segment number in the target segment list, removing the target segment number corresponding to the another particular segment from the target segment list.

9. A computing device, wherein the computer device comprises a memory and a processor, wherein computer-readable instructions are stored in the memory and executable by the processor, wherein the computer-readable instructions upon execution by the processor cause the processor to implement operations comprising:
obtaining a fragment file list by the computing device, wherein the fragment file list comprises information about a plurality of fragment files, each of the plurality of fragment files comprises one or more segments, and each of the one or more segments corresponds to a segment number, and the computing device is one of a plurality of client devices in a peer-to-peer (P2P) network;
determining at least one other client device in the P2P network from which a segment of a target fragment file is to be downloaded based on a downloading progress of downloading each segment of the target fragment file by each of the plurality of client devices in the P2P network, wherein the determining at least one other client device in the P2P network further comprises:
obtaining a first downloading progress of downloading each segment by the client device,
requesting a second downloading progress of downloading each segment of the target fragment file by the at least one other client devices in the P2P network,
determining that the second downloading progress of downloading each segment of the target fragment file is not greater than the first downloading progress, and
requesting again, from the at least one other client device, the second downloading progress of downloading each segment of the target fragment file by the at least one other client device;
downloading the segment of the target fragment file from the at least one other client device; and
stopping downloading the segment of the target fragment file from the at least one other client device, and downloading the segment of the target fragment file from a content delivery network (CDN) server in response to detecting that a player requests the target fragment file.

10. The computing device according to claim 9, wherein the computer-readable instructions upon execution by the processor further cause the processor to implement operations comprising:
playing the target fragment file by using the player when the target fragment file is completely downloaded.

11. The computing device according to claim 9, wherein the computer-readable instructions upon execution by the processor further cause the processor to implement operations comprising:
splitting the target fragment file at a predetermined time frequency to obtain a plurality of partial fragments, wherein the plurality of partial fragments comprise a first partial fragment and a second partial fragment; and
playing the first partial fragment by using the player when the first partial fragment is completely downloaded.

12. The computing device according to claim 9, wherein the computer-readable instructions upon execution by the processor further cause the processor to implement operations comprising:
determining the at least one other client device based on the first downloading progress and the second downloading progress.

13. The computing device according to claim 9, wherein the computer-readable instructions upon execution by the processor further cause the processor to implement operations comprising:
requesting the second downloading progress of downloading each segment of the target fragment file from the at least one other client device based on a request parameter, wherein the request parameter comprises a file name of the target fragment file; and
receiving response data from the at least one other client device, wherein the response data indicate the second downloading progress of downloading each segment of the target fragment file by the at least one other client device.

14. The computing device according to claim 9, wherein the computer-readable instructions upon execution by the processor further cause the processor to implement operations comprising:
responding to a request from the at least one other client device, and sending a corresponding segment to the at least one other client device; and
in response to determining that a quantity of bytes sent to the at least one other client device is greater than a preset threshold, refusing to respond to a data request from the at least one other client device.

15. The computing device according to claim 9, wherein the computer-readable instructions upon execution by the processor further cause the processor to implement operations comprising:
obtaining first information, second information, and a quantity of bytes of each segment, wherein the first information indicates a quantity of bytes that are obtained from the at least one other client device, and the second information indicates a quantity of bytes that are sent to the at least one other client device;
calculating a first ratio associated with each segment based on the first information and the quantity of bytes of each segment;
calculating a second ratio associated with each segment based on the second information and the quantity of bytes of each segment;
adjusting a target segment list based on at least one of the first ratio or the second ratio to obtain an adjusted target segment list, wherein the target segment list is configured to comprise at least one target segment number, and at least one target segment corresponding to the at least one target segment number is to be downloaded from the CDN server; and
downloading one or more target segments corresponding to one or more target segment numbers in the adjusted target segment list from the CDN server.

16. The computing device according to claim 15, wherein the computer-readable instructions upon execution by the processor further cause the processor to implement operations comprising:
in response to determining that a first ratio of a particular segment is less than a first preset ratio and that a segment number corresponding to the particular segment is not a target segment number in the target segment list, adding the segment number corresponding to the particular segment to the target segment list; and
in response to determining that a second ratio of another particular segment is less than a second preset ratio and that a segment number corresponding to the another particular segment is a target segment number in the target segment list, removing the target segment number corresponding to the another particular segment from the target segment list.

17. A non-transitory computer-readable storage medium, wherein the computer-readable storage medium stores computer-readable instructions, and wherein the computer-readable instructions upon execution by at least one processor cause the at least one processor to perform operations comprising:

obtaining a fragment file list by a client device in a peer-to-peer (P2P) network, wherein the fragment file list comprises information about a plurality of fragment files, each of the plurality of fragment files comprises one or more segments, and each of the one or more segments corresponds to a segment number;

determining at least one other client device in the P2P network from which a segment of a target fragment file is to be downloaded based on a downloading progress of downloading each segment of the target fragment file by each of the plurality of client devices in the P2P network, wherein the determining at least one other client device in the P2P network further comprises:

obtaining a first downloading progress of downloading each segment by the client device, requesting a second downloading progress of downloading each segment of the target fragment file by the at least one other client devices in the P2P network, determining that the second downloading progress of downloading each segment of the target fragment file is not greater than the first downloading progress, and requesting again, from the at least one other client device, the second downloading progress of downloading each segment of the target fragment file by the at least one other client device;

downloading the segment of the target fragment file from the at least one other client device; and stopping downloading the segment of the target fragment file from the at least one other client device, and downloading the segment of the target fragment file from a content delivery network (CDN) server in response to detecting that a player requests the target fragment file.

18. The non-transitory computer-readable storage medium according to claim 17, the operations further comprising:

splitting the target fragment file at a predetermined time frequency to obtain a plurality of partial fragments, wherein the plurality of partial fragments comprise a first partial fragment and a second partial fragment; and playing the first partial fragment by using the player when the first partial fragment is completely downloaded.

19. The non-transitory computer-readable storage medium according to claim 17, the operations further comprising:

responding to a request from the at least one other client device, and sending a corresponding segment to the at least one other client device; and in response to determining that a quantity of bytes sent to the at least one other client device is greater than a preset threshold, refusing to respond to a data request from the at least one other client device.

20. The non-transitory computer-readable storage medium according to claim 17, the operations further comprising:

obtaining first information, second information, and a quantity of bytes of each segment, wherein the first information indicates a quantity of bytes that are obtained from the at least one other client device, and the second information indicates a quantity of bytes that are sent to the at least one other client device;

calculating a first ratio associated with each segment based on the first information and the quantity of bytes of each segment;

calculating a second ratio associated with each segment based on the second information and the quantity of bytes of each segment;

adjusting a target segment list based on at least one of the first ratio or the second ratio to obtain an adjusted target segment list, wherein the target segment list is configured to comprise at least one target segment number, and at least one target segment corresponding to the at least one target segment number is to be downloaded from the CDN server; and downloading one or more target segments corresponding to one or more target segment numbers in the adjusted target segment list from the CDN server.

* * * * *